United States Patent
Yoshimura

(10) Patent No.: US 11,628,527 B2
(45) Date of Patent: Apr. 18, 2023

(54) WORK SUPPORT

(71) Applicant: KOSMEK LTD., Kobe (JP)

(72) Inventor: Gaku Yoshimura, Kobe (JP)

(73) Assignee: KOSMEK LTD., Kobe (JP)

(*) Notice: Subject to any disclaimer, the term of this patent is extended or adjusted under 35 U.S.C. 154(b) by 310 days.

(21) Appl. No.: 17/267,824

(22) PCT Filed: Oct. 11, 2019

(86) PCT No.: PCT/JP2019/040320
§ 371 (c)(1),
(2) Date: Feb. 11, 2021

(87) PCT Pub. No.: WO2020/085130
PCT Pub. Date: Apr. 30, 2020

(65) Prior Publication Data
US 2021/0187678 A1 Jun. 24, 2021

(30) Foreign Application Priority Data
Oct. 22, 2018 (JP) .............................. JP2018-198194

(51) Int. Cl.
*B23Q 1/28* (2006.01)
*B23Q 3/10* (2006.01)

(52) U.S. Cl.
CPC .............. *B23Q 1/28* (2013.01); *B23Q 3/108* (2013.01)

(58) Field of Classification Search
CPC .. B23Q 3/082; B23Q 3/10; B23Q 3/106–108; Y10T 279/1249
See application file for complete search history.

(56) References Cited

U.S. PATENT DOCUMENTS

2010/0052233 A1* 3/2010 Karras ................... B23Q 3/108
29/559

FOREIGN PATENT DOCUMENTS

JP 2014-159077 A 9/2014

OTHER PUBLICATIONS

Search Report dated Dec. 17, 2019, issued in corresponding International application No. PCT/JP2019/040320.

* cited by examiner

*Primary Examiner* — Tyrone V Hall, Jr.
(74) *Attorney, Agent, or Firm* — Bacon & Thomas, PLLC

(57) ABSTRACT

An ascent-detecting air supply port (33), a descent-detecting air supply port (43), and an air discharge port (44) are provided to a housing (2). The ascent-detecting air supply port (33) is communicatively connected to an air outlet (38) by an ascent-detecting air passage (39). The descent-detecting air supply port (43) is communicatively connected to the air discharge port (44) by a descent-detecting air passage (45). The descent-detecting air passage (45) is closed by a valve mechanism (49) including: a valve surface (50) provided on a piston portion (15); and a valve seat (51) provided on an inner surface of the housing (2), when an advance piston (14) is retracted to a lowered position.

11 Claims, 6 Drawing Sheets

WORK SUPPORT

TECHNICAL FIELD

The present invention relates to a work support configured to support a workpiece from below.

BACKGROUND ART

Known examples of such a work support include a device described in Patent Literature 1 specified below. The known device is structured as follows.

An air passage which communicatively connects an air supply port to an outside space is provided in a housing and in a support rod. The air passage is closed by a valve mechanism when the support rod is retracted to its lowered position. The valve mechanism includes: a valve surface provided on the support rod and facing downward; and a valve seat provided on a central member disposed in a lower portion of the housing, the valve seat facing upward. The device is configured to distinguish among the states: a retracted release state; a transition state in the course of advancing; and an advanced lock state, based on a pressure level of pressurized air supplied to the air supply port and based on a pressure level of locking-use pressure fluid (pressurized oil) supplied to a lock port.

CITATION LIST

Patent Literature

Patent Literature 1: Japanese Unexamined Patent Publication No. 2014-159077

SUMMARY OF INVENTION

Technical Problem

The above-described known device has the following disadvantage.

Deterioration of a rod seal attached to an upper end wall of the housing may cause swarf from workpieces, cutting fluid, and the like to enter the inside of the work support through a gap between the support rod and the rod seal. If swarf from workpieces, cutting fluid, and the like enter the inside of the work support, they may become stiff or solid. This may cause the support rod to stick to an inner peripheral surface of the housing and/or to an inner peripheral surface of a sleeve, for example, leading to a phenomenon in which the support rod does not move (does not ascend) even when pressurized oil is supplied to the lock port.

The valve mechanism is not opened without the ascent of the support rod, and therefore the pressure of pressurized air is kept at a predetermined high pressure level. A pressure detection means for pressurized air detects the pressure level and outputs an "ON" signal. Meanwhile, the pressure at the lock port increases from a low pressure level to a set locking pressure level. A pressure detection means for locking-use pressure fluid detects the increased pressure level and outputs an "ON" signal.

Also in the advanced lock state, however, the signal from the pressure detection means for pressurized air is "ON"; and the signal from the pressure detection means for locking-use pressure fluid is "ON".

That is, the work support described in Patent Literature 1 cannot distinguish the state in which support rod does not ascend from the advanced lock state. This problem occurs, if the support rod in the retracted release state does not ascend at all, not in the course of advancing (ascending) of the support rod.

An object of the present invention is to provide a work support capable of distinguishing among the states: a retracted release state; a state in which a support rod does not ascend when driven for advancing and locking; and an advanced lock state.

Solution to Problem

In order to achieve the above object, in a first aspect of the present invention, a work support is structured as follows, for example, as shown in FIG. 1 to FIG. 4.

In the first aspect of the invention, a work support includes: a housing 2; a support rod 5 supported by the housing 2 so as to be movable in an up-down direction and configured to be advanced/retracted relative to a workpiece W; an advance piston 14 including a piston portion 15 hermetically inserted in a tubular hole 13 in a lower portion of the housing 2 so as to be movable in the up-down direction; an advance-use pressure chamber 31 provided below the piston portion 15; a biasing means 18 configured to bias the support rod 5 upward; and a retracting means 19 configured to move the support rod 5 downward via the advance piston 14. The work support further includes: an ascent-detecting air supply port 33, a descent-detecting air supply port 43, and an air discharge port 44, which are provided to the housing 2; an air outlet 38 provided at a leading end portion of the support rod 5, the air outlet 38 being configured to be closed by the workpiece W; an ascent-detecting air passage 39 provided in the housing 2 and in the support rod 5, the ascent-detecting air passage 39 communicatively connecting the ascent-detecting air supply port 33 and the air outlet 38 to each other; a descent-detecting air passage 45 provided in the housing 2, the descent-detecting air passage 45 communicatively connecting the descent-detecting air supply port 43 and the air discharge port 44 to each other; and a valve mechanism 49 configured to close the descent-detecting air passage 45 when the advance piston 14 is retracted to a lowered position by the retracting means 19, the valve mechanism 49 including a valve surface 50 provided on the piston portion 15 and a valve seat 51 provided on an inner surface of the housing 2.

The work support of the first aspect provides the following functions and effects, on the premise that pressurized air is supplied to the ascent-detecting air supply port and to the descent-detecting air supply port.

In a retracted release state, air comes out from the air outlet provided at the leading end portion of the support rod, and therefore the pressure at the ascent-detecting air supply port is lower than its set pressure. Meanwhile, the valve mechanism is closed, and therefore the pressure at the descent-detecting air supply port has increased to its set pressure.

To the contrary, in an advanced lock state, the air outlet is closed by a workpiece, and this increases the pressure at the ascent-detecting air supply port to its set pressure. Meanwhile the valve mechanism is open, and therefore the pressure at the descent-detecting air supply port is lower than its set pressure.

Now, suppose that the support rod does not ascend when driven for advancing and locking from the retracted release state to the advanced lock state. Air continues to come out from the air outlet provided at the leading end portion of the support rod, and therefore the pressure at the ascent-detecting air supply port remains lower than its set pressure. Meanwhile, the closed valve mechanism is opened, which causes the pressure at the descent-detecting air supply port to be lower than its set pressure.

Thus, according to the first aspect, it is possible to distinguish among the states: the retracted release state; the state in which the support rod does not ascend when driven for advancing and locking; and the advanced lock state, based on the combinations of: the state of the pressurized air supplied to the ascent-detecting air supply port; and the state of the pressurized air supplied to the descent-detecting air supply port.

In order to achieve the above object, in a second aspect of the present invention, a work support is structured as follows, for example, as shown in FIG. 5.

In the second aspect of the invention, a work support includes: a housing 2; a support rod 5 supported by the housing 2 so as to be movable in an up-down direction and configured to be advanced/retracted relative to a workpiece W; an advance piston 14 including a piston portion 15 hermetically inserted in a tubular hole 13 in a lower portion of the housing 2 so as to be movable in the up-down direction; an advance-use pressure chamber 31 provided below the piston portion 15; a biasing means 18 configured to bias the support rod 5 upward; and a retracting means 19 configured to move the support rod 5 downward via the advance piston 14. The work support further includes: an ascent-detecting air supply port 33 and a descent-detecting air supply port 43, which are provided to the housing 2; an air outlet 38 provided at a leading end portion of the support rod 5, the air outlet 38 being configured to be closed by the workpiece W; an ascent-detecting air passage 39 provided in the housing 2 and in the support rod 5, the ascent-detecting air passage 39 communicatively connecting the ascent-detecting air supply port 33 and the air outlet 38 to each other; a descent-detecting air passage 45 provided in the housing 2 and in the support rod 5, the descent-detecting air passage 45 communicatively connecting the descent-detecting air supply port 43 and the air outlet 38 to each other; and a valve mechanism 49 configured to close the descent-detecting air passage 45 when the advance piston 14 is retracted to a lowered position by the retracting means 19, the valve mechanism 49 including a valve surface 50 provided on the piston portion 15 and a valve seat 51 provided on an inner surface of the housing 2.

The work support of the second aspect provides the following functions and effects, on the premise that pressurized air is supplied to the ascent-detecting air supply port and to the descent-detecting air supply port.

In the retracted release state, air comes out from the air outlet provided at the leading end portion of the support rod, and therefore the pressure at the ascent-detecting air supply port is lower than its set pressure. Meanwhile, the valve mechanism is closed, and therefore the pressure at the descent-detecting air supply port has increased to its set pressure.

To the contrary, in the advanced lock state, the air outlet is closed by a workpiece, and this increases the pressure at the ascent-detecting air supply port and the pressure at the descent-detecting air supply port to their respective set pressures.

Now, suppose that the support rod does not ascend when driven for advancing and locking from the retracted release state to the advanced lock state. Air continues to come out from the air outlet provided at the leading end portion of the support rod, and therefore the pressure at the ascent-detecting air supply port remains lower than its set pressure. Meanwhile, the closed valve mechanism is opened, which causes the pressure at the descent-detecting air supply port to be lower than its set pressure.

Thus, according to the second aspect, it is possible to distinguish among the states: the retracted release state; the state in which the support rod does not ascend when driven for advancing and locking; and the advanced lock state, based on the combinations of: the state of the pressurized air supplied to the ascent-detecting air supply port; and the state of the pressurized air supplied to the descent-detecting air supply port.

In each of the work supports of the first and second aspects, it is preferable that: the valve surface 50 is provided on an under surface of a flange portion 15a provided at an upper end portion of the piston portion 15; and the valve seat 51 is provided on an inner bottom surface of the housing 2.

This arrangement makes it easy to form the valve mechanism configured to close the descent-detecting air passage. The valve surface 50 is configured to come into contact with the valve seat 51 when the advance piston 14 is retracted to the lowered position by the retracting means 19, and thereby the descent-detecting air passage 45 is closed.

Furthermore, in each of the work supports of the first and second aspects, it is preferable that the retracting means 19 is a retraction spring 19 provided in the housing 2, the retraction spring 19 being in contact with a top surface of the flange portion 15a and biasing the advance piston 14 downward.

In this arrangement, the distance between the position at which the biasing force of the retracting means is exerted (i.e., on the top surface of the flange portion) and the valve surface is small, and this makes it possible to close the valve mechanism more reliably.

In order to achieve the above object, in a third aspect of the present invention, a work support is structured as follows, for example, as shown in FIG. 6.

In the third aspect of the invention, a work support includes: a housing 2; a support rod 5 supported by the housing 2 so as to be movable in an up-down direction and configured to be advanced/retracted relative to a workpiece W; an advance piston 14 including a piston portion 15 hermetically inserted in a tubular hole 13 in a lower portion of the housing 2 so as to be movable in the up-down direction; an advance-use pressure chamber 31 provided below the piston portion 15; a biasing means 18 configured to bias the support rod 5 upward; and a retracting means 19 configured to move the support rod 5 downward via the advance piston 14. The work support further includes: an ascent-detecting air supply port 33, a descent-detecting air supply port 43, and an air discharge port 44, which are provided to the housing 2; an air outlet 38 provided at a leading end portion of the support rod 5, the air outlet 38 being configured to be closed by the workpiece W; an ascent-detecting air passage 39 provided in the housing 2 and in the support rod 5, the ascent-detecting air passage 39 communicatively connecting the ascent-detecting air supply port 33 and the air outlet 38 to each other; a descent-detecting air passage 45 provided in the housing 2, the descent-detecting air passage 45 communicatively connecting the descent-detecting air supply port 43 and the air discharge port 44 to each other; and a valve mechanism 52 configured to close the descent-detecting air passage 45 when the advance piston 14 is retracted to a lowered position by the retracting means 19, the valve mechanism 52 including a closing surface 53 provided on an outer peripheral surface of the piston portion 15 and a to-be-closed surface 54 provided on an inner peripheral surface of the housing 2.

The work support of the third aspect provides functions and effects similar to those of the work support of the first aspect.

In the work support of the third aspect, it is preferable that: the closing surface 53 is provided on an outer peripheral surface of a flange portion 15a provided at an upper end portion of the piston portion 15; and the to-be-closed surface 54 is provided around an opening at a downstream end of an air passage 46, which is an element of the descent-detecting air passage 45 and extends from the descent-detecting air supply port 43.

This arrangement makes it easy to form the valve mechanism configured to close the descent-detecting air passage. The closing surface 53 is configured to face onto the to-be-closed surface 54 when the advance piston 14 is retracted to the lowered position by the retracting means 19, and thereby the descent-detecting air passage 45 is closed.

In each of the work supports of the first to third aspects, it is preferable that the biasing means 18 includes an advance spring 18 provided in a tubular hole 11 of the support rod 5, the advance spring 18 biasing the support rod 5 upward via the advance piston 14.

Advantageous Effects of Invention

According to embodiments of the present invention, it is possible to provide a work support capable of distinguishing among the states: a retracted release state; a state in which a support rod does not ascend when driven for advancing and locking; and an advanced lock state.

DESCRIPTION OF EMBODIMENTS

Figure 1:
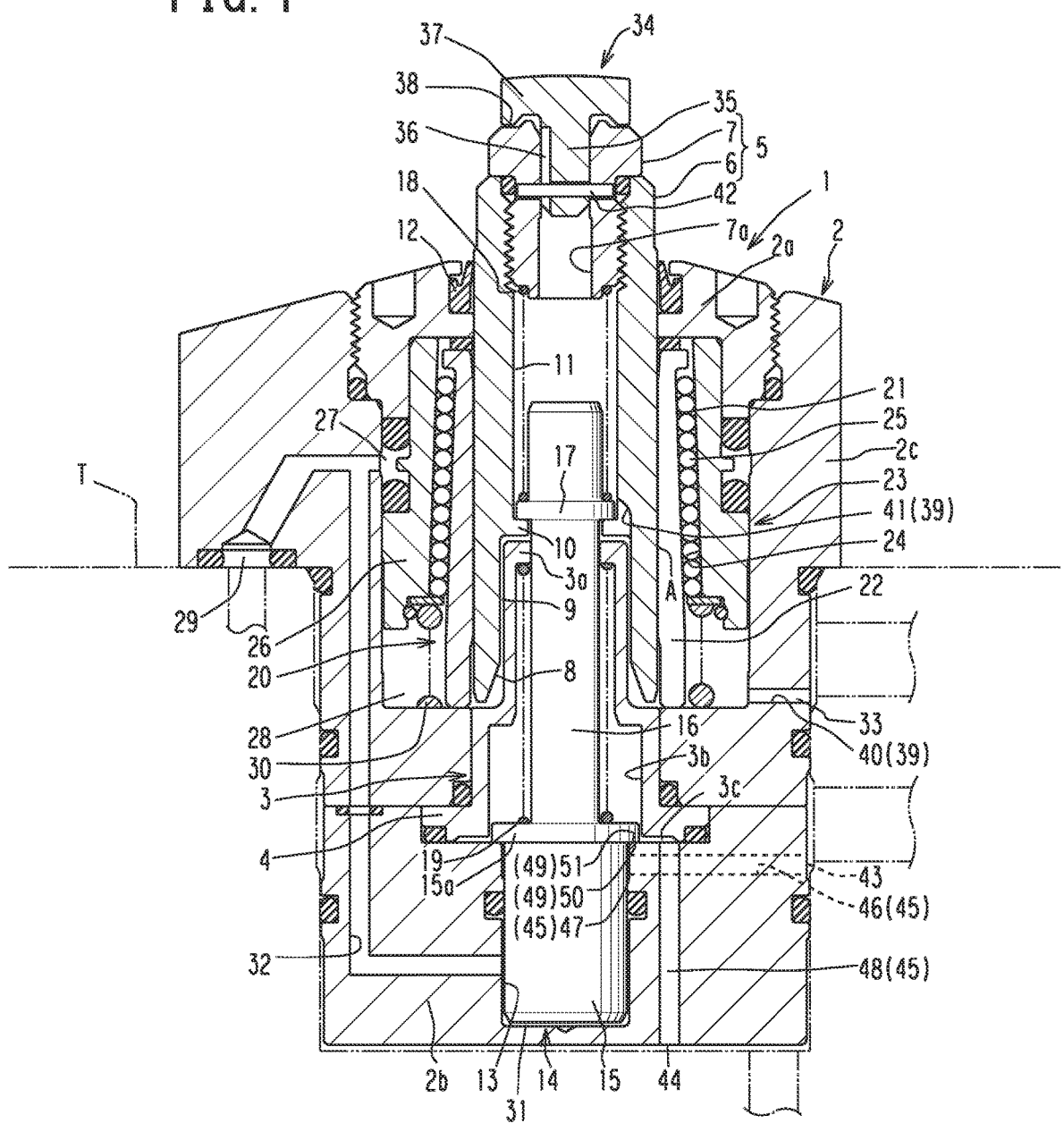
FIG. 1 shows a first embodiment of the present invention, and is an elevational view in section of a work support in a retracted release state.
Figure 2:
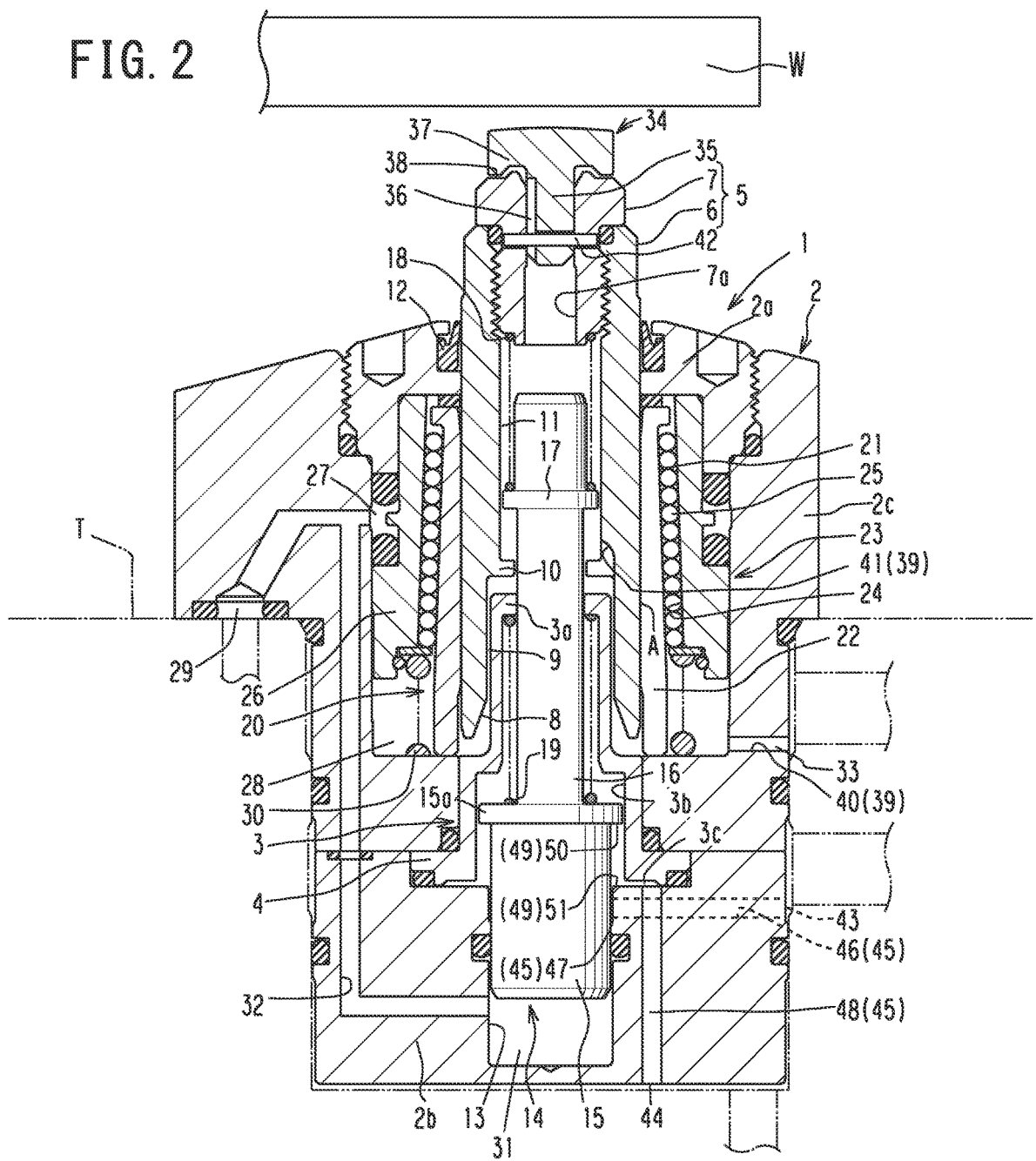
FIG. 2 is an elevational view in section of the work support which is in the course of transition from the retracted release state to an advanced lock state.
Figure 3:
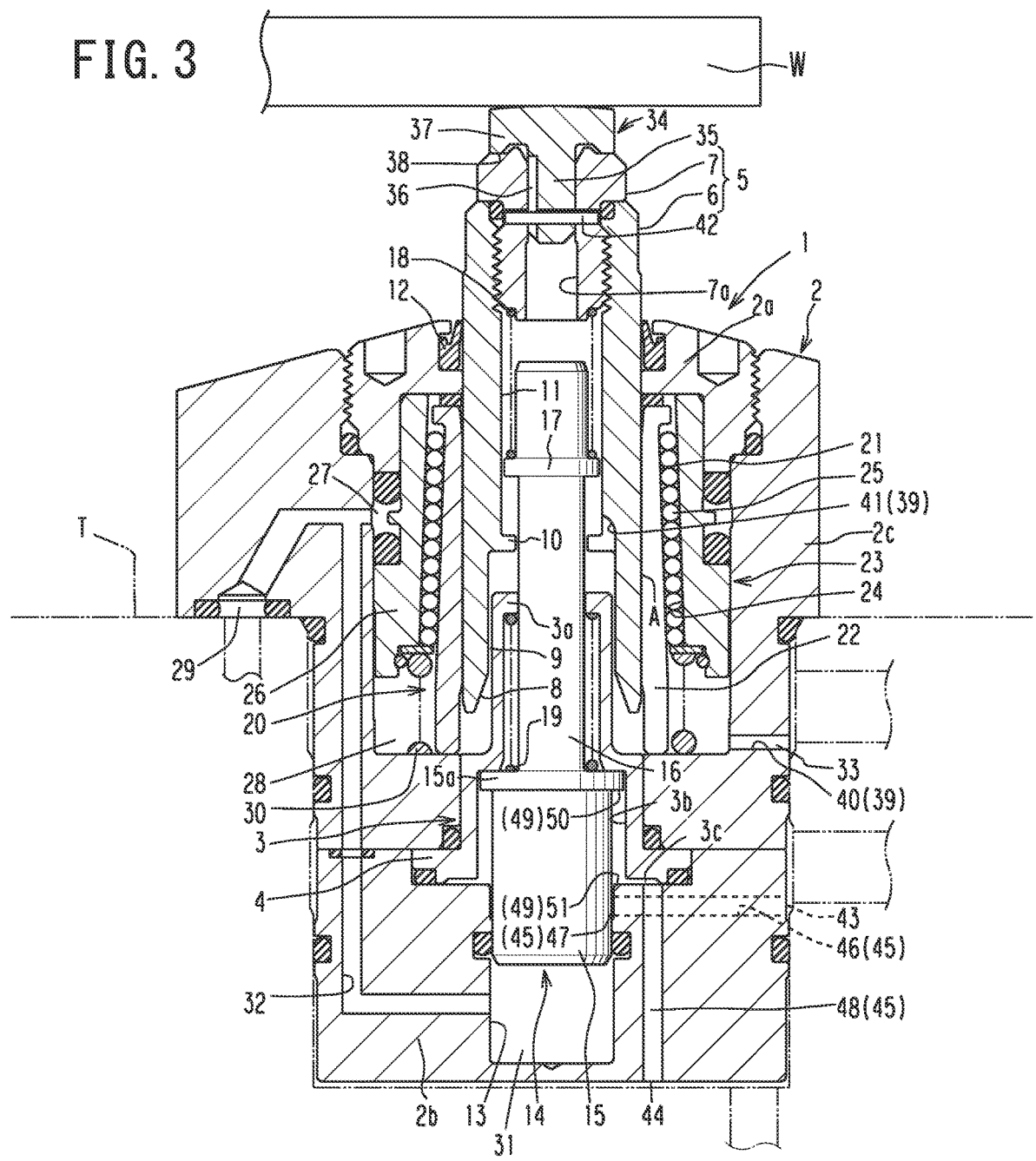
FIG. 3 is an elevational view in section of the work support in the advanced lock state.

FIG. 1 to FIG. 3 show a first embodiment of the present invention. The structure of a work support 1 of the first embodiment of the present invention will be described with reference to FIG. 1 to FIG. 3.

A housing 2 is attached to a stationary stand T such as a table. The housing 2 includes an upper end wall 2a, a lower end wall 2b, and a barrel portion 2c. A tubular central member 3 is provided at a central portion in a lower portion of the barrel portion 2c so as to extend upward. A lower flange 4 of the central member 3 is sandwiched between the lower end wall 2b and the barrel portion 2c and fixed to the lower end wall 2b and to the barrel portion 2c. The central member 3 is an element structuring the housing 2.

A support rod 5 is supported by the housing 2 so as to be movable in the up-down direction. The support rod 5 includes: a tubular rod member 6 and an upper end block 7. The rod member 6 includes: a tapered hole 8; a first tubular hole 9 with a larger diameter; an inner peripheral step portion 10; and a second tubular hole 11 with a smaller diameter, which are provided in this order from a lower end portion to an upper end portion of the rod member 6. The upper end block 7 is screwed to an upper end portion of the second tubular hole 11. A rod seal 12 having a function of scraper is attached between an upper portion of the rod member 6 and the upper end wall 2a. A lower portion of the rod member 6 is fitted over the central member 3 with a predetermined gap between them.

A piston portion 15 of an advance piston 14 is hermetically inserted in a tubular hole 13 of the lower end wall 2b of the housing 2 so as to be movable in the up-down direction. A rod portion 16 is provided to protrude upward from the piston portion 15. An engaged portion 17 provided at an upper portion of the rod portion 16 is configured to come into contact with the inner peripheral step portion 10 of the rod member 6 of the support rod 5 from above. An advance spring 18 biasing the support rod 5 upward via the advance piston 14 is provided in the second tubular hole 11 of the rod member 6.

A retraction spring 19 biasing the advance piston 14 downward is provided between: a flange portion 15a provided at an upper end portion of the piston portion 15; and an upper end wall 3a of the central member 3. These springs are designed so that the biasing force of the retraction spring 19 is larger than the biasing force of the advance spring 18.

A sleeve member 20 formed by a tubular collet is fitted over a gripped and held area A provided on an outer peripheral surface of the support rod 5. The sleeve member 20 includes: a tapered outer peripheral surface 21 tapering down upward; and a slit 22 extending in the up-down direction. The slit 22 allows the sleeve member 20 to decrease its diameter elastically. An annular transmission tool 23 is disposed on an outer peripheral side of the sleeve member 20. A tapered inner peripheral surface 24 of the transmission tool 23 is opposed from above to the tapered outer peripheral surface 21. A plurality of balls 25 are inserted in an annular tapered gap created between the tapered outer peripheral surface 21 and the tapered inner peripheral surface 24.

A locking-use piston portion 26 is provided to protrude radially outward from the transmission tool 23. A locking actuation chamber 27 is provided above the locking-use piston portion 26, while a spring chamber 28 is provided below the locking-use piston portion 26. A lock port 29 is communicatively connected to the locking actuation chamber 27. A return spring 30 is attached in the spring chamber 28. An advance-use pressure chamber 31 provided below the piston portion 15 of the advance piston 14 is communicatively connected to the lock port 29 by a connection passage 32 provided in the lower end wall 2b and the barrel portion 2c of the housing 2.

An ascent-detecting air supply port 33, to which pressurized air is supplied, is provided on a side surface of the barrel portion 2c. A through hole 7a extending in the up-down direction is provided through the upper end block 7 forming an upper end portion of the support rod 5. A rod portion 35 of a contact tool 34 is inserted in the through hole 7a so as to be movable up and down. A communication passage 36 of a groove-like shape is provided on an outer periphery of the rod portion 35 so as to extend in the up-down direction. An annular air outlet 38 is provided between: a large diameter portion 37 provided at an upper portion of the contact tool 34; and the upper end block 7. The contact tool 34 is retained to the upper end block 7 with a pin 42 to prevent the contact tool 34 from being pushed out by pressurized air.

The ascent-detecting air supply port 33 is communicatively connected to the air outlet 38 by an ascent-detecting air passage 39. In this embodiment, the ascent-detecting air passage 39 includes: an air passage 40 extending horizontally from the ascent-detecting air supply port 33 and provided in the barrel portion 2c; the spring chamber 28; the slit 22 of the sleeve member 20; the tapered hole 8 of the rod member 6 of the support rod 5; a gap between an inner peripheral surface of a lower half portion of the rod member 6 and an outer peripheral surface of the central member 3; a groove 41 provided at the inner peripheral step portion 10 of the rod member 6; the second tubular hole 11 of the rod member 6; the through hole 7a of the upper end block 7; and the communication passage 36 provided on the contact tool 34.

The pressure of pressurized air supplied to the ascent-detecting air supply port 33 is detected by a pressure detection means, which is not illustrated.

A descent-detecting air supply port 43 to which pressurized air is supplied is provided on a side surface of the lower end wall 2b. An air discharge port 44 is provided on an under surface of the lower end wall 2b. The descent-detecting air supply port 43 is communicatively connected to the air discharge port 44 by a descent-detecting air passage 45. A valve mechanism 49 is disposed in the descent-detecting air passage 45.

In this embodiment, the descent-detecting air passage 45 includes: an air passage 46 extending horizontally from the descent-detecting air supply port 43 and provided in the lower end wall 2b; a gap 47 between an outer peripheral surface of the piston portion 15 of the advance piston 14 and the tubular hole 13 of the lower end wall 2b; a tubular hole 3b of the central member 3 and a counterbore portion 3c below the tubular hole 3b; and an exhaust passage 48 provided in the lower end wall 2b and extending in the up-down direction.

The pressure of pressurized air supplied to the descent-detecting air supply port 43 is detected by a pressure detection means, which is not illustrated.

The valve mechanism 49 includes: a valve surface 50 provided on an under surface of the flange portion 15a of the piston portion 15; and a valve seat 51 provided on an inner bottom surface on the lower end wall 2b.

The work support 1 operates as follows.

In a retracted release state shown in FIG. 1, pressurized oil functioning as locking-use pressure fluid in the locking actuation chamber 27 has been discharged through the lock port 29, and the transmission tool 23 has been moved upward by the return spring 30, to allow the sleeve member 20 to expand. Furthermore, the advance piston 14 has been retracted to its lowered position by the retraction spring 19. Due to this, the engaged portion 17 of the advance piston 14 pushes the inner peripheral step portion 10 of the support rod 5 downward, with the result that the support rod 5 has been lowered. In this situation, the valve surface 50 provided on the under surface of the flange portion 15a of the piston portion 15 is in contact with the valve seat 51 provided on the inner bottom surface on the lower end wall 2b, and therefore the valve mechanism 49 is closed. (The valve surface 50 is in contact with the valve seat 51, and thereby the descent-detecting air passage 45 is closed.) Furthermore, because the ascent-detecting air supply port 33 and the air outlet 38 are communicatively connected to each other by the ascent-detecting air passage 39, the contact tool 34 has been raised by the pressure of pressurized air supplied to the ascent-detecting air supply port 33, and air comes out from the air outlet 38.

A part of pressurized air supplied to the ascent-detecting air supply port 33 flows into the tubular hole 3b of the central member 3 through a small gap between an inner peripheral surface of the upper end wall 3a of the central member 3 and an outer peripheral surface of the rod portion 16 of the advance piston 14, and then the air is discharged from the air discharge port 44 via the exhaust passage 48. However, because the space created by the groove 41 provided at the inner peripheral step portion 10 of the rod member 6 is sufficiently larger than the above-mentioned small gap, only a small amount of pressurized air is discharged from the air discharge port 44, and a large amount of pressurized air flows upward through the second tubular hole 11 of the rod member 6 and comes out from the air outlet 38.

In this retracted release state, pressurized air comes out from the air outlet 38, and therefore the pressure of pressurized air supplied to the ascent-detecting air supply port 33 has decreased. Such a low pressure level is detected by the pressure detection means (not shown), which generates an "OFF" signal. Meanwhile, because the valve mechanism 49 is closed, the pressure of pressurized air supplied to the descent-detecting air supply port 43 has increased to a predetermined pressure. Such a high pressure level is detected by the pressure detection means (not shown), which generates an "ON" signal.

In the above-described retracted release state, a workpiece W (see FIGS. 2 and 3) is brought from above, and a body of the workpiece W is supported by a support table (not shown). Thereafter, pressurized oil is supplied to the lock port 29.

Then, as shown in FIG. 2, prior to the pressure in the locking actuation chamber 27 provided with a throttle mechanism, the pressure in the advance-use pressure chamber 31 increases first, and this causes the advance piston 14 to ascend against the biasing force of the retraction spring 19. Simultaneously with this, the advance spring 18 raises the support rod 5. Due to this, the valve surface 50 provided on the under surface of the flange portion 15a of the piston portion 15 is separated from the valve seat 51 provided on the inner bottom surface on the lower end wall 2b, to open the valve mechanism 49.

In such a transition state shown in FIG. 2, pressurized air comes out from the air outlet 38, as same as in the retracted release state. Therefore, the pressure of the pressurized air supplied to the ascent-detecting air supply port 33 has decreased. Such a low pressure level is detected by the pressure detection means (not shown), which generates an "OFF" signal. Meanwhile, the valve mechanism 49 is open, differently from in the retracted release state. This decreases the pressure of pressurized air supplied to the descent-detecting air supply port 43. Such a low pressure level is detected by the pressure detection means (not shown), which generates an "OFF" signal.

As the support rod 5 ascends, the contact tool 34 comes into contact with an under surface of the workpiece W as shown in FIG. 3, and this closes the air outlet 38.

Subsequently, the pressure in the locking actuation chamber 27 increases, and the transmission tool 23 is moved downward by the hydraulic force applied from the locking actuation chamber 27 to the locking-use piston portion 26. This causes the tapered inner peripheral surface 24 of the transmission tool 23 to smoothly engage onto the tapered outer peripheral surface 21 of the sleeve member 20 while rolling the balls 25, to contract the sleeve member 20. As a result, the sleeve member 20 pushes the gripped and held area A of the support rod 5 radially inward, so that the support rod 5 is gripped and held.

A top surface of the workpiece W is machined in the above-described advanced lock state. A downward pushing force exerted to the workpiece W in the machining process is received by the support rod 5 of the work support 1.

In the advanced lock state shown in FIG. 3, the air outlet 38 is closed, and this increases the pressure of pressurized air supplied to the ascent-detecting air supply port 33 to a predetermined pressure. Such a high pressure level is detected by the pressure detection means (not shown), which generates an "ON" signal. Meanwhile, because the valve mechanism 49 is open, the pressure of pressurized air supplied to the descent-detecting air supply port 43 has decreased. Such a low pressure level is detected by the pressure detection means (not shown), which generates an "OFF" signal.

After the machining process on the workpiece W is finished, pressurized oil is discharged from the locking actuation chamber 27. As a result, the transmission tool 23 is first of all pushed upward by the return spring 30. The transmission tool 23 moves upward while the tapered inner peripheral surface 24 of the transmission tool 23 rolls the balls 25, and this releases the pushed tapered outer peripheral surface 21 of the sleeve member 20. Consequently, the sleeve member 20 expands due to its elastic restoring force, to release the locked support rod 5. Thereafter, the biasing force of the retraction spring 19 lowers the support rod 5 to its lowered position via the engaged portion 17 of the advance piston 14. Thus, the device returns from the advanced lock state shown in FIG. 3 to the retracted release state shown in FIG. 1.

Now, suppose that, due to the deterioration of the rod seal 12, swarf from the workpiece W, cutting fluid, and the like enter the inside of the work support 1 through a gap between the support rod 5 and the rod seal 12. This may cause the support rod 5 to stick to an inner peripheral surface of the housing 2 and/or to an inner peripheral surface of the sleeve member 20, for example, in the retracted release state, to hinder the support rod 5 from ascending even when pressurized oil is supplied to the lock port 29 (when the support rod 5 is driven for advancing and locking). In this case, the device operates as follows.

Because pressurized air continues to come out from the air outlet 38, the pressure of pressurized air supplied to the ascent-detecting air supply port 33 remains low. Such a low pressure level is detected by the pressure detection means (not shown), which generates an "OFF" signal. Meanwhile, due to the pressurized oil supplied to the lock port 29, the advance piston 14 ascends even though the support rod 5 does not ascend. As a result, the valve mechanism 49 is opened and this decreases the pressure of pressurized air supplied to the descent-detecting air supply port 43. Such a low pressure level is detected by the pressure detection means (not shown), which generates an "OFF" signal.

The respective signals output from the pressure detection means (not shown) for the pressurized air supplied to the ascent-detecting air supply port 33 and from the pressure detection means (not shown) for the pressurized air supplied to the descent-detecting air supply port 43 are as follows. In the retracted release state shown in FIG. 1, the respective signals are "OFF" and "ON". In the state in which the support rod 5 does not ascend when driven for advancing and locking, the respective signals are "OFF" and "OFF". In the advanced lock state shown in FIG. 3, the respective signals are "ON" and "OFF". Thus, the work support 1 is capable of distinguishing among the states: the retracted release state; the state in which the support rod 5 does not ascend when driven for advancing and locking; and the advanced lock state, based on the combinations of: the pressure level of the pressurized air supplied to the ascent-detecting air supply port 33; and the pressure level of the pressurized air supplied to the descent-detecting air supply port 43.

It should be noted that the respective signals are "OFF" and "OFF", both (i) in the state in which the support rod 5 does not ascend when driven for advancing and locking, and (ii) in the normal transition state shown in FIG. 2, in which the support rod 5 ascends when driven for advancing and locking.

Figure 4:
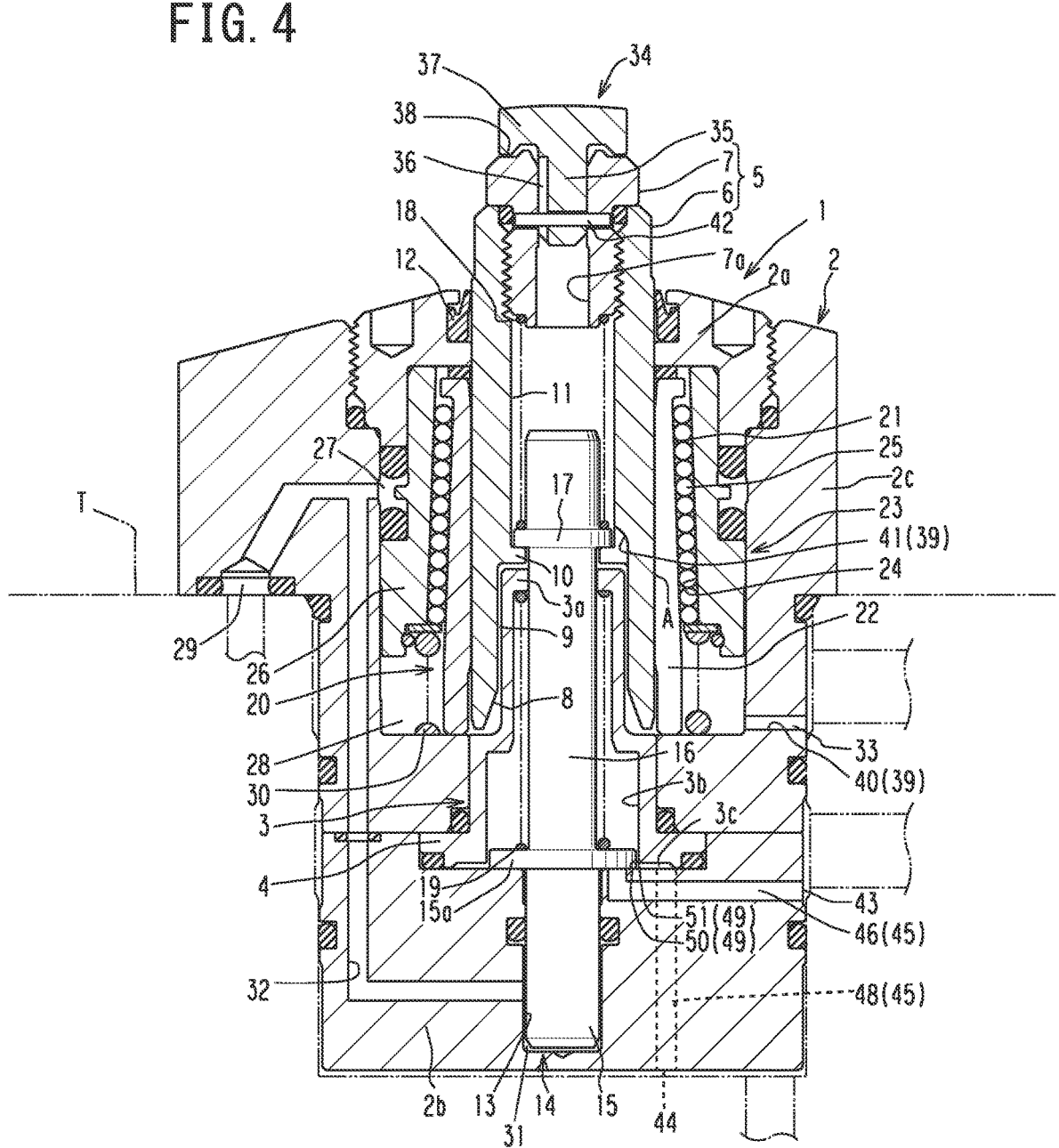
FIG. 4 shows a second embodiment of the present invention, and is a diagram corresponding to FIG. 1.

FIG. 4 shows a second embodiment of the present invention. The second embodiment is different from the first embodiment in the following points.

As shown in FIG. 4, in the work support 1 of the second embodiment, the air passage 46 extending horizontally from the descent-detecting air supply port 43 and provided in the lower end wall 2b is arranged to bend upward at its downstream-side end portion and to open onto an bottom surface on the lower end wall 2b. In this arrangement, the air passage 46 is directly closed by the valve surface 50 provided on the under surface of the flange portion 15a of the piston portion 15, when the advance piston 14 is retracted to its lowered position. This makes it easier to close the descent-detecting air passage 45 than in the configuration of the first embodiment.

Figure 5:
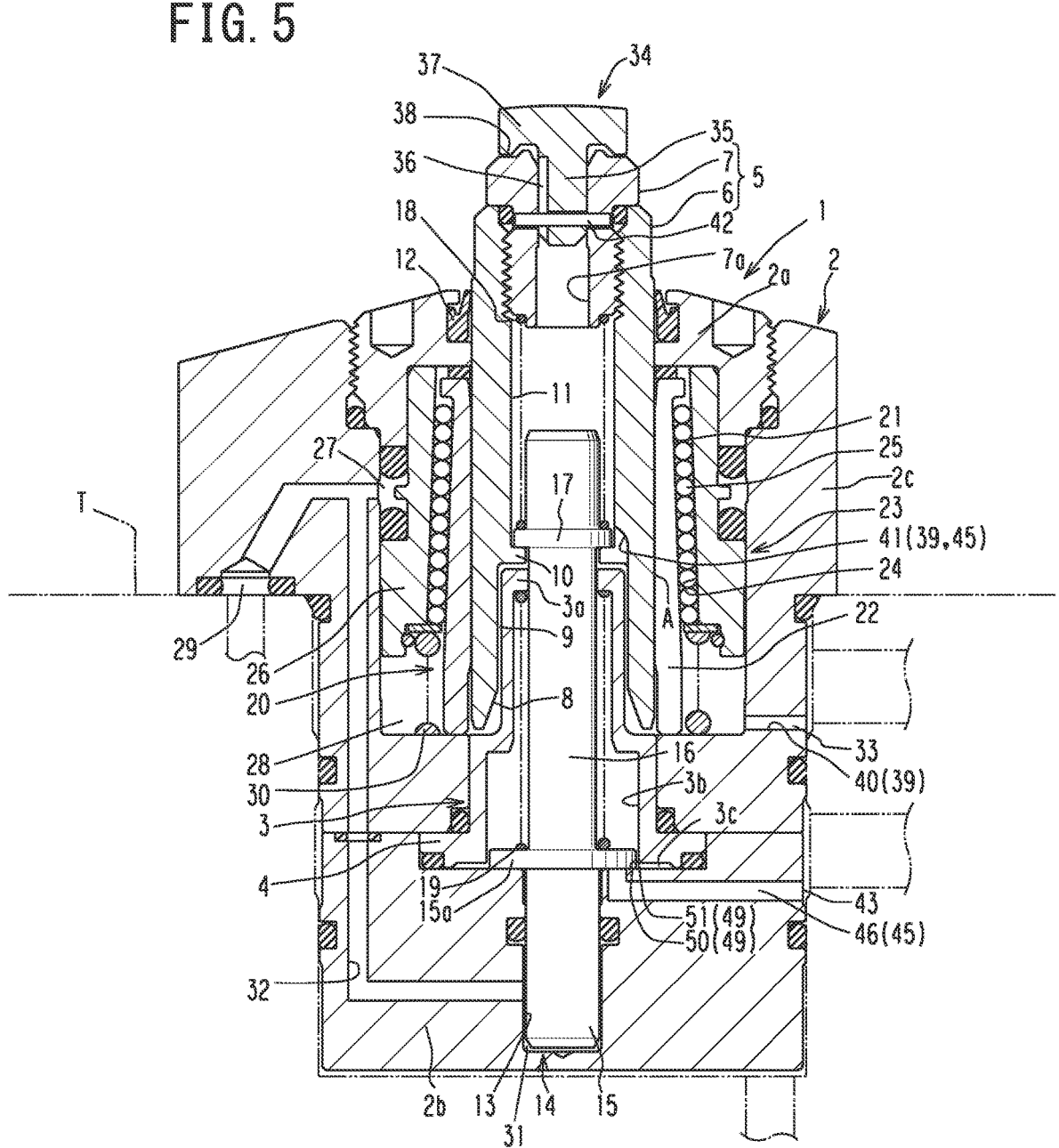
FIG. 5 shows a third embodiment of the present invention, and is a diagram corresponding to FIG. 1.

FIG. 5 shows a third embodiment of the present invention. The third embodiment is different from the second embodiment in the following points.

The work support 1 of the third embodiment includes no exhaust passage 48.

The descent-detecting air passage 45 of this embodiment communicatively connects the descent-detecting air supply port 43 to the air outlet 38, and includes: the air passage 46 extending horizontally from the descent-detecting air supply port 43 and then bending upward, the air passage 46 being provided in the lower end wall 2b; the counterbore portion 3c and the tubular hole 3b of the central member 3; a gap between the upper end wall 3a of the central member 3 and the rod portion 16 of the advance piston 14; the groove 41 provided at the inner peripheral step portion 10 of the rod member 6; the second tubular hole 11 of the rod member 6; the through hole 7a of the upper end block 7; and the communication passage 36 provided on the contact tool 34. In the third embodiment, a portion of the ascent-detecting air passage 39 is shared with the descent-detecting air passage 45.

The respective signals output from the pressure detection means (not shown) for the pressurized air supplied to the ascent-detecting air supply port 33 and from the pressure detection means (not shown) for the pressurized air supplied to the descent-detecting air supply port 43 are as follows. In the retracted release state shown in FIG. 5, the respective signals are "OFF" and "ON". In the state in which the support rod 5 does not ascend when driven for advancing and locking, the respective signals are "OFF" and "OFF". In the advanced lock state, the respective signals are "ON" and "ON". Thus, the work support 1 of the third embodiment, which has no exhaust passage 48, is also capable of distinguishing among the states: the retracted release state; the state in which the support rod 5 does not ascend when driven for advancing and locking; and the advanced lock state, based on the combinations of: the pressure level of the pressurized air supplied to the ascent-detecting air supply port 33; and the pressure level of the pressurized air supplied to the descent-detecting air supply port 43.

Figure 6:
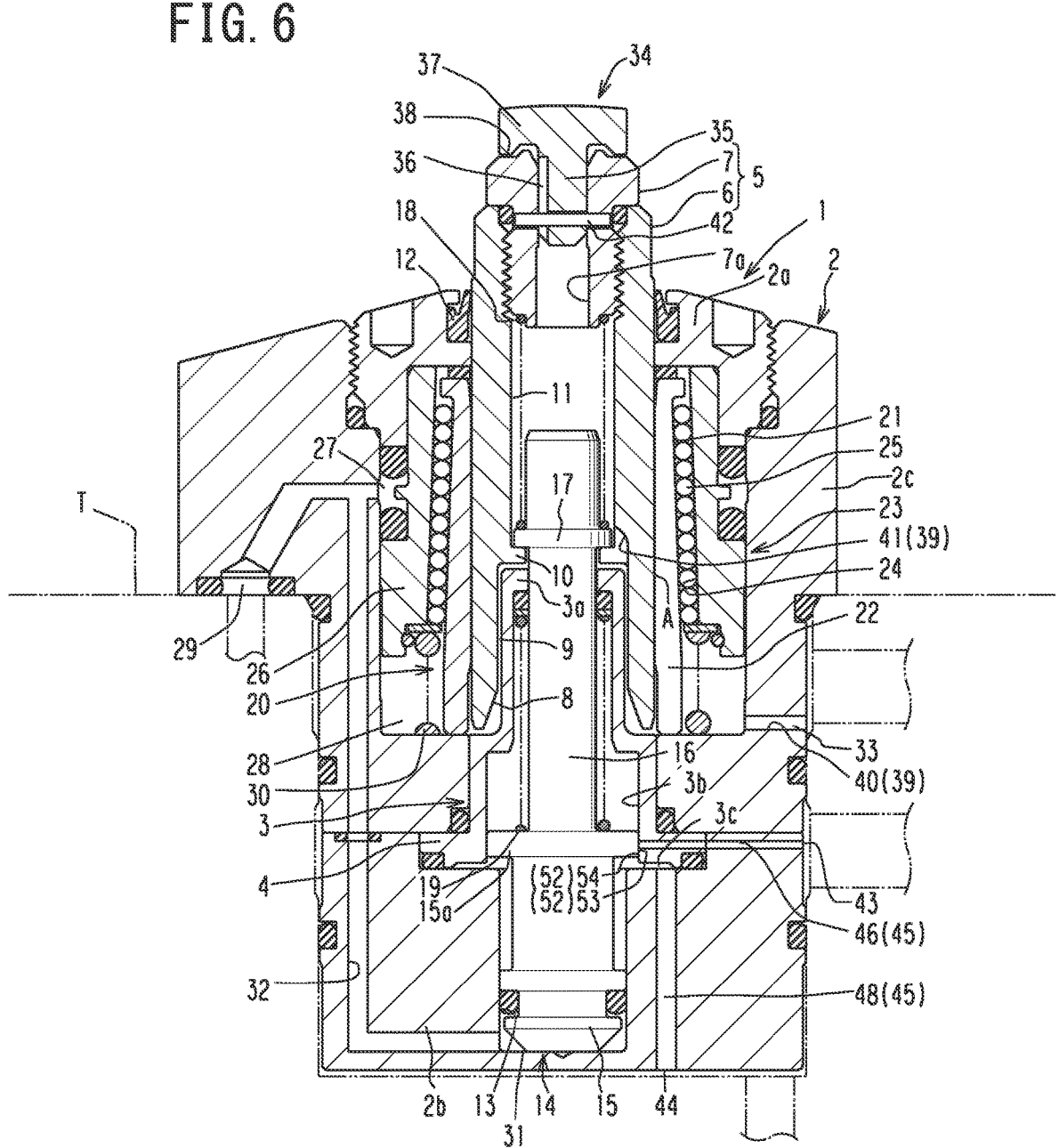
FIG. 6 shows a fourth embodiment of the present invention, and is a diagram corresponding to FIG. 1.

FIG. 6 shows a fourth embodiment of the present invention. The fourth embodiment is different from the first embodiment in the following points.

In the work support 1 of the fourth embodiment, a closing surface 53, which is an element of a valve mechanism 52, is provided on an outer peripheral surface of the flange portion 15a provided at the upper end portion of the piston portion 15 of the advance piston 14. Furthermore, a to-be-closed surface 54, which is an element of the valve mechanism 52, is provided on an inner peripheral surface of a lower end portion of the lower flange 4 of the central member 3 of the housing 2.

The to-be-closed surface 54 of the valve mechanism 52 is provided around an opening at a downstream end of the air passage 46 extending from the descent-detecting air supply port 43. The to-be-closed surface 54 is configured to face onto the closing surface 53 when the advance piston 14 is retracted to its lowered position. Thus, the opening at the downstream end of the air passage 46 is closed by the closing surface 53, and thereby the descent-detecting air passage 45 is closed. When the advance piston 14 is raised by the pressurized oil supplied to the lock port 29, the closing surface 53 moves away from the to-be-closed surface 54, and this opens the descent-detecting air passage 45.

The above-described embodiments are changeable as follows.

In each of the above embodiments, an "ON" signal is output in response to a high pressure level of pressurized air and an "OFF" signal is output in response to a low pressure level of pressurized air. Instead of this, the device may be arranged so that an "OFF" signal is output in response to a high pressure level of pressurized air and an "ON" signal is output in response to a low pressure level of pressurized air.

Instead of the pressure of pressurized air, the flow rate of pressurized air may be used to detect the state of pressurized air. The flow rate of pressurized air increases when the air outlet 38 is open, and the flow rate increases when the valve mechanism 49 (or the valve mechanism 52) is open. To the contrary, the flow rate of pressurized air decreases when the air outlet 38 is closed; and the flow rate decreases when the valve mechanism 49 (or the valve mechanism 52) is closed. Using such changes in the flow rates, it is possible to detect a change of the state of pressurized air supplied to the ascent-detecting air supply port 33 and a change of the state of pressurized air supplied to the descent-detecting air supply port 43.

In each of the above embodiments, the support rod 5 is biased upward not only by the biasing force of the advance spring 18, but also by the biasing force of pressurized air supplied to the ascent-detecting air supply port 33. That is, in each of the above embodiments, the advance spring 18 and the pressurized air supplied to the ascent-detecting air supply port 33 are used as a biasing means configured to bias the support rod 5 upward. Instead of this, only the pressurized air supplied to the ascent-detecting air supply port 33 may be used as the biasing means configured to bias the support rod 5 upward, without providing the advance spring 18.

In each of the above-described first, second, and fourth embodiments, the retraction spring 19 is used as a retracting means configured to move the support rod downward via the advance piston 14. Instead of this, the retracting means may be constituted by: a pressure chamber, which is provided in an internal space of the central member 3 using a sealing member such as an O ring while keeping the communication between the air passage 46 and the exhaust passage 48 via the valve mechanism 49 (or the valve mechanism 52); and releasing-use pressure fluid such as pressurized oil and compressed air supplied to the pressure chamber.

Instead of pressurized oil, gas such as compressed air may be used as locking-use pressure fluid. Furthermore, the sleeve member 20 may be structured by a thin sleeve, instead of a collet.

Embodiments and modifications of the present invention have been hereinabove described. It is a matter of course that other changes or alterations can be made on the present invention within the scope of envisagement of one skilled in the art.

REFERENCE SIGNS LIST

1: work support; 2: housing; 5: support rod; 11: tubular hole; 13: tubular hole; 14: advance piston; 15: piston portion; 15a: flange portion; 31: advance-use pressure chamber; 18: advance spring (biasing means); 19: retraction spring (retracting means); 33: ascent-detecting air supply port; 38: air outlet; 39: ascent-detecting air passage; 43: descent-detecting air supply port; 44: air discharge port; 45: descent-detecting air passage; 46: air passage; 49: valve mechanism; 50: valve surface; 51: valve seat; 52: valve mechanism; 53: closing surface; 54: to-be-closed surface; W: workpiece.

The invention claimed is:

1. A work support comprising:
   a housing;
   a support rod supported by the housing so as to be movable in an up-down direction and configured to be advanced/retracted relative to a workpiece;
   an advance piston including a piston portion hermetically inserted in a tubular hole in a lower portion of the housing so as to be movable in the up-down direction;
   an advance-use pressure chamber provided below the piston portion;
   a biasing means configured to bias the support rod upward; and
   a retracting means configured to move the support rod downward via the advance piston,
   the work support further comprising:
   an ascent-detecting air supply port, a descent-detecting air supply port, and an air discharge port, which are provided to the housing;
   an air outlet provided at a leading end portion of the support rod, the air outlet being configured to be closed by the workpiece;
   an ascent-detecting air passage provided in the housing and in the support rod, the ascent-detecting air passage communicatively connecting the ascent-detecting air supply port and the air outlet to each other;
   a descent-detecting air passage provided in the housing, the descent-detecting air passage communicatively connecting the descent-detecting air supply port and the air discharge port to each other; and
   a valve mechanism configured to close the descent-detecting air passage when the advance piston is retracted to a lowered position by the retracting means, the valve mechanism including a valve surface provided on the piston portion and a valve seat provided on an inner surface of the housing.

2. The work support according to claim 1, wherein:
   the valve surface (50) is provided on an under surface of a flange portion (15a) provided at an upper end portion of the piston portion (15);

the valve seat (51) is provided on an inner bottom surface of the housing (2); and the valve surface (50) is configured to come into contact with the valve seat (51) when the advance piston (14) is retracted to the lowered position by the retracting means (19), and thereby the descent-detecting air passage (45) is closed.

3. The work support according to claim 2, wherein:

the retracting means is a retraction spring provided in the housing, the retraction spring being in contact with a top surface of the flange portion and biasing the advance piston downward.

4. The work support according to claim 1, wherein the biasing means includes an advance spring provided in a tubular hole of the support rod, the advance spring biasing the support rod upward via the advance piston.

5. A work support comprising:

a housing;

a support rod supported by the housing so as to be movable in an up-down direction and configured to be advanced/retracted relative to a workpiece;

an advance piston including a piston portion hermetically inserted in a tubular hole in a lower portion of the housing so as to be movable in the up-down direction;

an advance-use pressure chamber provided below the piston portion;

a biasing means configured to bias the support rod upward; and a retracting means configured to move the support rod downward via the advance piston, the work support further comprising:

an ascent-detecting air supply port and a descent-detecting air supply port, which are provided to the housing;

an air outlet provided at a leading end portion of the support rod, the air outlet being configured to be closed by the workpiece;

an ascent-detecting air passage provided in the housing and in the support rod, the ascent-detecting air passage communicatively connecting the ascent-detecting air supply port and the air outlet to each other;

a descent-detecting air passage provided in the housing and in the support rod, the descent-detecting air passage communicatively connecting the descent-detecting air supply port and the air outlet to each other; and a valve mechanism configured to close the descent-detecting air passage when the advance piston is retracted to a lowered position by the retracting means, the valve mechanism including a valve surface provided on the piston portion and a valve seat provided on an inner surface of the housing.

6. The work support according to claim 5, wherein:

the valve surface is provided on an under surface of a flange portion provided at an upper end portion of the piston portion;

the valve seat is provided on an inner bottom surface of the housing; and the valve surface is configured to come into contact with the valve seat when the advance piston is retracted to the lowered position by the retracting means, and thereby the descent-detecting air passage is closed.

7. The work support according to claim 6, wherein:

the retracting means is a retraction spring provided in the housing, the retraction spring being in contact with a top surface of the flange portion and biasing the advance piston downward.

8. The work support according to claim 5, wherein the biasing means includes an advance spring provided in a tubular hole of the support rod, the advance spring biasing the support rod upward via the advance piston.

9. A work support comprising:

a housing;

a support rod supported by the housing so as to be movable in an up-down direction and configured to be advanced/retracted relative to a workpiece;

an advance piston including a piston portion hermetically inserted in a tubular hole in a lower portion of the housing so as to be movable in the up-down direction;

an advance-use pressure chamber provided below the piston portion;

a biasing means configured to bias the support rod upward; and a retracting means configured to move the support rod downward via the advance piston, the work support further comprising:

an ascent-detecting air supply port, a descent-detecting air supply port, and an air discharge port, which are provided to the housing;

an air outlet provided at a leading end portion of the support rod, the air outlet being configured to be closed by the workpiece;

an ascent-detecting air passage provided in the housing and in the support rod, the ascent-detecting air passage communicatively connecting the ascent-detecting air supply port and the air outlet to each other;

a descent-detecting air passage provided in the housing, the descent-detecting air passage communicatively connecting the descent-detecting air supply port and the air discharge port to each other; and a valve mechanism configured to close the descent-detecting air passage when the advance piston is retracted to a lowered position by the retracting means, the valve mechanism including a closing surface provided on an outer peripheral surface of the piston portion and a to-be-closed surface provided on an inner peripheral surface of the housing.

10. The work support according to claim 9, wherein:

the closing surface is provided on an outer peripheral surface of a flange portion provided at an upper end portion of the piston portion;

the to-be-closed surface is provided around an opening at a downstream end of an air passage, which is an element of the descent-detecting air passage and extends from the descent-detecting air supply port; and the closing surface is configured to face onto the to-be-closed surface when the advance piston is retracted to the lowered position by the retracting means, and thereby the descent-detecting air passage is closed.

11. The work support according to claim 9, wherein the biasing means includes an advance spring provided in a tubular hole of the support rod, the advance spring biasing the support rod upward via the advance piston.

* * * * *